(No Model.)
A. H. G. ELTEN.
COMBINED HOOK AND MOLDING FOR HANGING CLOTHES OR PICTURES.
No. 451,270. Patented Apr. 28, 1891.
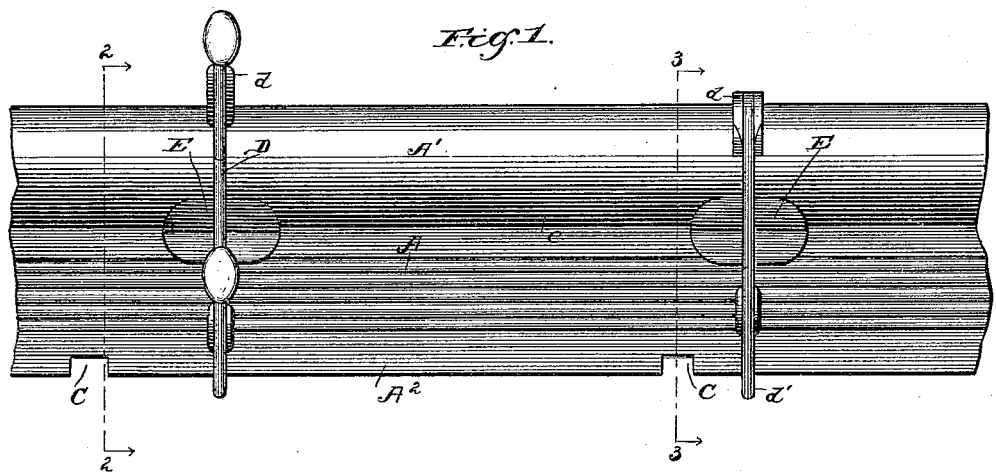
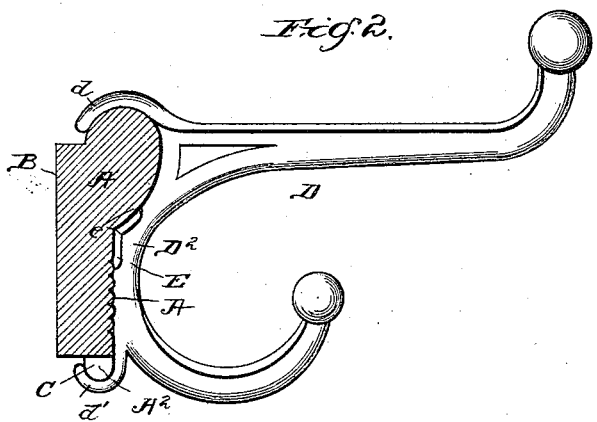
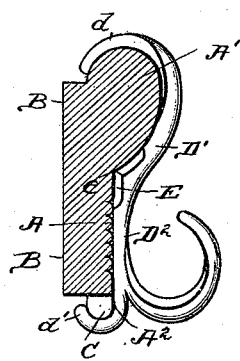
Witnesses.
Wm M. Rheem
J. R. Andrews
Inventor.
Adolph H. G. Elten
By Charles T. Brown,
Atty.

UNITED STATES PATENT OFFICE.

ADOLPH HERMAN GUSTAV ELTEN, OF CHICAGO, ILLINOIS, ASSIGNOR OF ONE-HALF TO EDWARD A. HARTWELL, OF SAME PLACE.

COMBINED HOOK AND MOLDING FOR HANGING CLOTHES OR PICTURES.

SPECIFICATION forming part of Letters Patent No. 451,270, dated April 28, 1891.

Application filed November 25, 1889. Serial No. 331,526. (No model.)

*To all whom it may concern:*

Be it known that I, ADOLPH HERMAN GUSTAV ELTEN, a citizen of the United States, and a resident of Chicago, in the county of Cook and State of Illinois, have invented certain new and useful Improvements in a Combined Hook and Molding for Hanging Clothes or Pictures, of which the following is a specification.

My invention relates to that class of hooks which have lips adapted to embrace the top and bottom of a strip or piece of molding provided with ribs to receive said lips; and the invention consists in a strip or molding peculiarly adapted to be used with such hooks. Heretofore such strips or moldings have been made of such form that if it was desired to add other hooks it was necessary to take down the strips or moldings, which would be very difficult and troublesome in case the molding was used to hang pictures on, and especially if there were already large pictures hung thereon. In such case it would be necessary to take down the pictures and take out the nails by which the moldings were fastened, and thus run the risk of damaging the moldings or walls, or both. My invention is designed to overcome this difficulty by providing a molding on which additional hooks can be placed on any part of the molding without removing said molding from the walls or even touching any of the pictures thereon, and yet the hooks are so made as to firmly remain in place.

I have illustrated my invention by the drawings accompanying and forming a part of this specification, in which—

Figure 1 is a front elevation of a molding with hooks secured thereon embodying my invention. Fig. 2 is a sectional view of the molding on line 2 2 of Fig. 1, viewed in the direction of the arrow, together with a side elevation of my improved clothes-hook attached to such molding. Fig. 3 is a sectional view of my improved molding on line 3 3 of Fig. 1, together with an elevation of the picture-hook employed by me attached to such molding.

Like letters refer to like parts throughout the several views.

A is the molding.

A' is a half-round extension or face of the molding, which springs from the body A thereof, and extending above the base and upper edge of such molding A.

$A^2$ is a half-round extension of the molding on the lower edge thereof, which extends below the base of the molding in substantially the same manner as does the half-round extension A' extend above such base.

B is the base of the molding.

C C are notches or openings in half-round extension $A^2$ of the molding. These notches are arranged at regular, but not necessarily frequent, intervals in the molding, and are there placed for the purpose of permitting attachment of the hook in the manner hereinafter fully explained.

D is a clothes-hook, and D' is a picture-hook. The hook D, so far as the functions thereof in connection with the molding hereinabove described is concerned, is identical with the picture-hook D', and I therefore letter such parts of said hooks which come in contact with and combine with the molding A with like letters.

$D^2$ is the base of the hooks.

$d$ is the hooked end of the upper portion of the base $D^3$ of hooks D D', and engages with the half-round extension A' of the molding A. The projecting hook $d'$ enters and passes through notch C of the molding A.

E E are ears or lugs extending outward from the base $D^2$ of the hooks D D' at about the part of such base which comes in contact with the molding at the point on the molding where the half-round projection A' springs from the main body of the molding A, such point being lettered $e$.

The manner in which the hook is secured on the molding is extremely simple, and consists merely in placing hooked extensions $d$ of the hook over half-round extension A' of the molding, of passing the hooked end $d'$ of the hook through notch C of the molding and then sliding the hook along the molding by the notch to the point at which such hook is to be used.

It will be evident on inspection of the drawings that the ears E E are placed upon the hook for the purpose of preventing its cramping or locking as it is slid into position on the molding, and hence such ears are not an absolutely necessary part of the hooks, and where the base of the hook is of considerable width such ears are not desired.

Having thus described my invention, what I claim, and desire to secure by Letters Patent of the United States, is—

1. In a molding, the combination of a base, a half-round extension A' extending along and beyond the upper edge of such base, a half-round extension A² extending along and beyond the lower edge of such base, and openings made through the last-named extension, whereby the hooked end of the base of a hook can be placed over the upper of the half-round extensions and the hook at the other end of the base of such hook can be passed through the openings in the extension and the hook secured to the molding by sliding it thereon, substantially as described.

2. A molding having a half-round extension extending along and beyond the upper edge of the base thereof, and a half-round extension with openings therein extending along and beyond the lower edge of such base, in combination with a hook having a base and a hooked end or finger at each end of such base, one of such hooked ends being adapted to go over the half-round extension on the upper edge of the molding and the other of such hooked ends being adapted to pass through the openings in the other of the extensions of the molding and fit over such extension as the hook is slid on the molding and thereby secured thereto, substantially as described.

ADOLPH HERMAN GUSTAV ELTEN.

Witnesses:
ROBERT J. MASON,
WILLIAM E. DANKERT.